United States Patent [19]

Rolke et al.

[11] Patent Number: 5,256,384
[45] Date of Patent: Oct. 26, 1993

[54] ACTIVATED CARBON PROCESS FOR REMOVING HYDROGEN SULFIDE FROM GASES

[75] Inventors: Dietrich Rolke, Hofheim; Peter Cornel, Frankfurt am Main; Rainer Lell, Nidderau; Klaus Stetzer, Dreieich; Gabriele Neuroth, Frankfurt, all of Fed. Rep. of Germany

[73] Assignee: Metallgesellschaft Aktiengesellschaft, Frankfurt am Main, Fed. Rep. of Germany

[21] Appl. No.: 857,761

[22] Filed: Mar. 26, 1992

[30] Foreign Application Priority Data

Mar. 26, 1991 [DE] Fed. Rep. of Germany ....... 4109892

[51] Int. Cl.$^5$ .............................................. C01B 17/16
[52] U.S. Cl. ..................................... 423/220; 423/230; 423/233; 423/244.03; 423/244.06; 423/576; 423/576.2; 423/576.8
[58] Field of Search ............... 423/576.8, 576, 244.06, 423/244.05, 244.03, 244.01, 233, 230, 220, 576.2; 444/244.1

[56] References Cited

U.S. PATENT DOCUMENTS

| | | | |
|---|---|---|---|
| 4,141,962 | 2/1979 | Dupuy et al. | 423/571 |
| 4,219,537 | 8/1980 | Steiner | 423/569 |
| 4,263,271 | 4/1981 | Henning et al. | 423/573 G |
| 5,039,507 | 8/1991 | Sturm | 423/569 |

FOREIGN PATENT DOCUMENTS

| | | |
|---|---|---|
| 505889 | 9/1954 | Canada . |
| 0505889 | 9/1954 | Canada . |
| 0215317 | 3/1987 | European Pat. Off. . |
| 0218302 | 4/1987 | European Pat. Off. . |
| 1467100 | 12/1968 | Fed. Rep. of Germany . |
| 1567774 | 8/1970 | Fed. Rep. of Germany . |
| 1667636 | 3/1972 | Fed. Rep. of Germany . |
| 2430909 | 1/1976 | Fed. Rep. of Germany . |
| 3407884A1 | 9/1985 | Fed. Rep. of Germany . |
| 3520166A1 | 12/1986 | Fed. Rep. of Germany . |
| 3739909 | 6/1989 | Fed. Rep. of Germany . |
| WO87/02654 | 5/1987 | PCT Int'l Appl. . |

OTHER PUBLICATIONS

"Claus Sulfur Plant Operation for the Maintenance of Catalyst Activity" by William S. Norman presented to Gas Conditioning Conference on Mar. 8, 1976 in Norman, Oklahoma U.S.A.; Kaiser Aluminum & Chemical Corp. Baton Rouge, Louisana U.S.A.

Primary Examiner—Gary P. Straub
Assistant Examiner—Timothy C. Vanoy
Attorney, Agent, or Firm—Herbert Dubno; Jonathan Myers

[57] ABSTRACT

To a gas which contains $H_2S$ and water vapor and which is to be desulfurized oxygen is added at such a rate that the gas contains 1 to 20 moles $O_2$ per mole of $H_2S$. At a temperature in the range of 50° to 180° C. the gas is contacted with activated carbon, which is thus laden with elemental sulfur and with at least 3% by weight sulfuric acid. In a suitable processing, the gas which is to be desulfurized and contains at least 1000 ppm $H_2S+SO_2$ is initially passed at a temperature from 100° to 180° C. through a catalytic prepurifier, in which elemental sulfur is adsorbed on a high-metal-oxide catalyst, oxygen is admixed to the gas coming from the prepurifier and the gas at a temperature of 50° to 180° is contacted with the activated carbon for a final desulfurization.

5 Claims, 1 Drawing Sheet

ACTIVATED CARBON PROCESS FOR REMOVING HYDROGEN SULFIDE FROM GASES

FIELD OF THE INVENTION

Our present invention relates to a process for desulfurizing a gas which contains H₂S and water vapor by means of activated carbon, wherein elemental sulfur is formed with which the activated carbon is laden and which is removed from the activated carbon as the latter is regenerated.

BACKGROUND OF THE INVENTION

A process in this activated carbon is used to remove H₂S from gases is known and has been described, e.g., in Published German Application 15 67 774.

OBJECT OF THE INVENTION

It is an object of the invention to provide an improved process of the above-described type which can be used to treat various gases which contain H₂S and which permits a loading of the activated carbon not only with elemental sulfur but also with sulfuric acid.

SUMMARY OF THE INVENTION

This object is accomplished in accordance with the invention in that oxygen is supplied to the gas that is to be desulfurized so that the gas contains 1 to 20 moles of O₂ per mole of H₂S and the gas at temperatures in the range from 50° to 180° C. is contacted with the activated carbon to provide the activated carbon with a loading which contains elemental sulfur and at least 3% by weight of the activated carbon of sulfuric acid.

By contrast, in known processes care is taken to suppress a simultaneous formation of sulfuric acid in addition to elementary sulfur on the activated carbon and special measures are required for that purpose. Such measures can be avoided in the process in accordance with the invention and the share of the sulfuric acid in the entire loading on the activated carbon may preferably amount to 5 to about 50% by weight. Surprisingly, this has been found not to give rise to difficulties in the regeneration of the activated carbon. In most cases the gas supplied to the activated carbon contains 500 to 5000 ppm H₂S.

According to a further feature of the invention the gas which is to be desulfurized and contains at least 1000 ppm H₂S + SO₂ is initially passed at a temperature from 100° to 180° C. through a catalytic prepurification, in which elemental sulfur is adsorbed on a high-metal-oxide catalyst (i.e. a catalyst having a high content of metal oxides and, therefore, a catalyst high in the metal oxide component), oxygen is admixed to the H₂S-containing gas coming from the prepurification and the gas at a temperature of 50 to 180° C. is contacted with the activated carbon for a final desulfurization.

Suitable high-metal oxide catalysts for use in the prepurification may mainly consist of substances consisting mainly of Al₂O₃ or TiO₂. Such catalysts are preferably impregnated in addition with about 0.5 to 5% by weight iron, cobalt or nickel. Such catalysts are known per se and have been described, e.g., in European Patent 0 215 317.

The activated carbon which is laden with elemental sulfur and sulfuric acid may be regenerated in various ways. In one method the activated carbon at a temperature of 100 to 400° C. is treated with an oxygen-free reducing gas. That reducing gas may consist, e.g., of hydrogen, methane or H₂S.

In a preferred processing of the adsorbent, the activated carbon laden with elementary sulfur and H₂SO₄ is re-generated by treating it with a partial stream or the entire stream of the H₂S-containing gas which is to be desulfurized and which is at a temperature from 100° to 400° C. In that case the sulfuric acid is initially reduced to elemental sulfur or in part also to sulfur dioxide

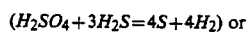

(H₂SO₄ + 3H₂S = 4S + 4H₂) or

3H₂SO₄ + H₂S = 4SO₂ + 4H₂O)

and the elemental sulfur is subsequently removed as vapor by the same gas.

In the first regenerating step, in which the sulfuric acid is reduced, the H₂S-containing gas in contact with the laden activated carbon is preferably at a temperature from 100° to 180° C., at which the gas will also be desulfurized The second regenerating step, in which the same gas is used to remove the elemental sulfur still present on the activated carbon, is preferably carried out at a temperature in the range of 200° to 400° C.

If the process includes a prepurification, the high-metal-oxide catalyst will have to be regenerated too. In this case the reducing gas used for the regeneration is suitably contacted with the laden activated carbon and with the high-metal-oxide catalyst and at least part of the gas is suitably circulated. The reducing gas may first be contacted with the activated carbon or with the high-metal-oxide catalyst.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
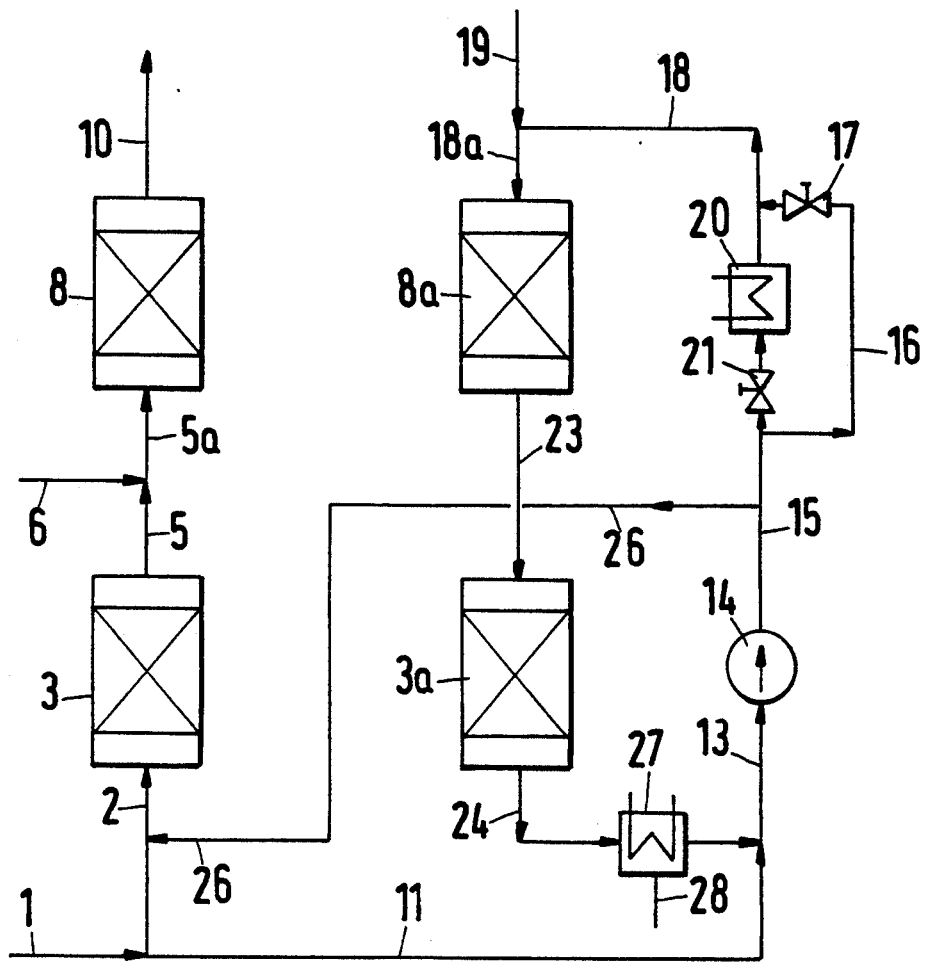
FIG. 1 is a flow diagram of a process according to the invention comprising a gas purification and regeneration and FIG. 2 illustrates a modified final purification.

The H₂S-containing gas which is to be regenerated is supplied in line 1 as shown in FIG. 1. That gas contains SO₂ and also water vapor and in addition may contain other sulfur compounds, such as COS and CS₂. The gas can come from a Claus process plant and in most cases is at a temperature of 120° to 180° C.

At such elevated temperatures all or part of the gas is initially fed in line 2 to a prepurification stage 3, which contains a high-metal-oxide catalyst in a fixed bed. The main component of the catalyst used in the prepurification stage 3 consists of Al₂O₃ or TiO₂. Elemental sulfur will be deposited on that catalyst

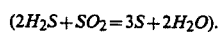

(2H₂S + SO₂ = 3S + 2H₂O).

Partly purified gas leaves the prepurifier 3 via line 5 and in many cases will have a residual H₂S content of only 500 to 3000 ppm. Air in a controlled proportion is supplied to that gas through line 6. The final purification stage contains a bed of granular activated carbon having a particle size in the range from 1 to 6 mm and a BET surface area in the range from 500 to 1500 m²/g.

Care is taken to form in the final purification stage at a temperature of 100° to 180° C. preferably 130° to 160° C., a loading of elemental sulfur and at least 3% by weight sulfuric acid on that activated carbon.

In the loading on the activated carbon the weight ratio of elemental sulfur to sulfuric acid lies in the range from 20:1 to 1:2 in most cases.

Purified gas having a H₂S content usually not in excess of 20 ppm, preferably not in excess of 8 ppm, is discharged via line 10. The SO₂ content of the purified gas is not in excess of 600 ppm, preferably not in excess of 200 ppm.

The regeneration of the laden high-metal-oxide catalyst in stage 3a from a prior prepurification and the regeneration of a laden activated carbon in stage 8a from a prior final purification stage 8 are illustrated on the right in FIG. 1. In the present case the regeneration is effected by means of a partial stream of the H₂S-containing gas, which has been branched in line 11 from the H₂S-containing gas supplied in line 1.

The gas used for the regeneration enters the line 13 and is fed by a fan 14 through line 15 to a by-pass line 16, which contains an open valve 17. The gas then flows in lines 18 and 18a into the bed of the laden activated carbon catalyst in the stage 8a.

If required, a reducing gas from an external source, such as a high-H₂S gas, is admixed from line 19. The temperature in line 18a is in the range of 120° to 180° C. and preferably in the range from 130° to 160° C. The temperature is controlled by a heater 20, through which a partial stream of the gas may be passed when the valve 21 is opened to a larger or smaller extent and the valve 17 has properly been adjusted That partial stream will then be heated and subsequently admixed with the gas in line 16.

In the first regenerating step the activated carbon in stage bed 8a is at a temperature from 120° to 180° C. and care is taken that the sulfuric acid which constitutes a part of the loading is entirely or substantially reduced to elemental sulfur. Effluent gas is supplied in line 23 to the catalyst bed of stage 3a and further in line 24 through the cooler 27 and then back to line 13. A partial stream of the gas can be removed in line 26 from the cycle and can be admixed with the gas which flows in line 2 and is to be treated.

To remove the elemental sulfur loading from the catalysts in stages 3a and 8a, the supply of gas in line 19 is interrupted and the temperature of the gas in lines 18 and 18a is increased to 200° to 400° and preferably to at least 300° C. For that purpose the gas in line 15 is passed through the heater 20 and the by-pass line 16 is throttled.

The gas which flows in line 23 and contains elemental sulfur is contacted with the high-metal oxide catalyst in stage 3a to remove the loading of elemental sulfur from this catalyst. The elemental sulfur is removed from the gas in the cooler 27, in which the elemental sulfur is condensed and from which it is drained through line 28.

For the sake of clearness the arrangement of lines permitting a switchover of the adsorbers between the loading and regenerating modes is not shown as such arrangements are well known to those skilled in the art.

Figure 2:
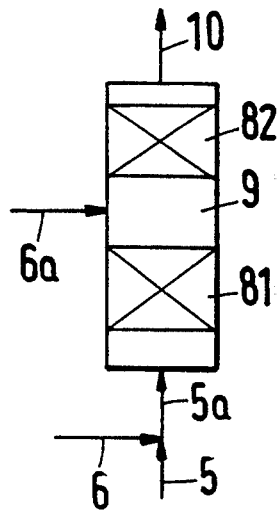

FIG. 2 shows the use of two beds 81 and 82, which contain activated carbon for the final purification. Before the gas is supplied through line 5a to the first bed, air is supplied to line 6 to the first bed 81 and in line 6a to the region 9 between the beds 81 and 82. The H₂S:O₂ molar ratio in line 5a is about 1:1 to 1:3. A H₂S:O₂ molar ratio of about 1:3 to 1:19 with respect to the H₂S content in line 5 is maintained in the region 9. The H₂S content of the gas has substantially been removed from the gas before it enters the intermediate region 9.

EXAMPLE

A processing system as shown in FIG. 1 is used to treat exhaust gas from a Claus process plant. That gas flows at a rate of 7545 sm³/h (sm³=standard cubic meter or m³ STP) in line 1. The prepurifier 3 contains an Al₂O₃ catalyst which is impregnated with 1% by weight nickel. The residence time of the gas in the prepurifier 3 to 6 seconds and the residence time of the gas in contact with the activated carbon of the final purifier 8 is 3 seconds. Air at 135° C. is supplied in line 6 at a rate of 120 sm³/h.

The following Table contains data for the gas mixtures in the various lines. The beds or stages 8a and 3a are assumed to be subjected to the first regenerating step for reducing the sulfuric acid on the activated carbon or stage 8a. The activated carbon is laden with 5% by weight H₂SO₄ at the beginning of the regeneration.

TABLE

| LINE | 1 | 5 | 11 | 18A | 19 | 26 |
|---|---|---|---|---|---|---|
| Rate (sm³/h) | 7545 | 7564 | 200 | 2310 | 10 | 243 |
| Pressure (bars) | 1.18 | 1.14 | 1.18 | 1.30 | 1.5 | 1.20 |
| Temperature (°C.) | 135 | 148 | 135 | 145 | 49 | 135 |
| COMPOSITION | | | | | | |
| H₂S (vol. %) | 0.85 | 0.17 | 0.85 | 0.48 | 95.4 | 0.07 |
| SO₂ (vol. %) | 0.15 | 0.02 | 0.15 | 4.95 | — | 6.25 |
| H₂O (vol. %) | 34.35 | 35.08 | 34.35 | 32.81 | 3.0 | 32.52 |
| N₂ (vol. %) | 58.75 | 58.82 | 58.75 | 56.08 | — | 55.58 |
| CO₂ (vol. %) | 5.90 | 5.91 | 5.90 | 5.63 | 1.6 | 5.58 |
| S (kg/h) | 16.40 | 1.08 | 0.43 | 4.62 | — | 0.53 |

The pure gas in line 10 still contains 0.02% by volume SO₂ and 8 ppm H₂S. To remove the elemental sulfur from the beds of stages 3a and 8a, the gas in line 18 is heated to 320° C. and the gas stream in line 19 is shut off. In the cooler 27, a total amount of 3200 kg sulfur is separated at 135° C. during a regenerating phase.

We claim:

1. A process for desulfurizing a Claus tail gas containing at least 1000 ppm of H₂S+SO₂, the H₂S being present in a stoichiometric excess according to the equation:

$$2H_2S + SO_2 = 3S + 2H_2O,$$

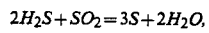

said starting gas having a temperature in the range of 100° to 180° C., comprising the steps of:
(a) passing a first partial stream of said starting gas through a catalytic prepurification stage containing a metal oxide catalyst consisting essentially of Al₂O₃ or TiO₂, adsorbing elemental sulfur on said catalyst, and withdrawing from aid prepurification stage a prepurified gas containing H₂S and ate vapor;
(b) admixing oxygen with said prepurified gas from step (a) so that said prepurified gas contains 1 to 20 moles of O₂ per mole of H₂S, to produce an oxygen-containing prepurified gas;
(c) contacting said oxygen-containing prepurified gas with activated carbon at a temperature in the range of 50° to 180° C. to obtain the desulfurized gas and to load said activated carbon with elemental sulfur and at least 3% by weight of sulfuric acid;

(d) regenerating said activated carbon after the loading by contacting said activated carbon laden with elemental sulfur and sulfuric acid with a second partial stream of said starting gas, in a first regeneration step, said second partial stream being at about the same temperature in the range of 100° to 180° C. as the first partial stream of said starting gas being passed through said prepurification stage; in said first regenerating step sulfuric acid in the laden activated carbon is substantially reduced to elemental sulfur, and in a second regeneration step contacting said laden activated carbon with said second partial stream of starting gas at a temperature in the range of 200° to 400° C. to remove the elemental sulfur from the activated carbon; and (e) removing elemental sulfur from the second partial stream of starting gas used for regeneration in step (d) and feeding the desulfurized second partial stream of starting gas into said catalytic prepurification stage of step (a).

2. The process defined in claim 1 wherein the activated carbon is distributed in two beds traversed in succession by said prepurified gas to be desulfurized and containing $H_2S$ and water vapor and the oxygen is admixed with the prepurified gas to be desulfurized prior to its passage through each bed.

3. The process defined in claim 1 further comprising the step of admixing a second gas containing $H_2S$ with the second partial stream of said starting gas in said first regenerating step.

4. The process defined in claim 3 wherein the laden activated carbon and the metal oxide catalyst are regenerated at the same time by the second partial stream of said starting gas which is contacted with the laden activated carbon and the metal oxide catalyst.

5. The process defined in claim 1 wherein the laden activated carbon and the metal oxide catalyst are regenerated at the same time by the second partial stream of said starting gas which is contacted with the laden activated carbon and the metal oxide catalyst.

* * * * *